US011420135B2

(12) United States Patent
Nieuwoudt et al.

(10) Patent No.: US 11,420,135 B2
(45) Date of Patent: Aug. 23, 2022

(54) MULTI-PASS CONTACT TRAY FOR A MASS TRANSFER COLUMN AND METHOD INVOLVING SAME

(71) Applicant: KOCH-GLITSCH, LP, Wichita, KS (US)

(72) Inventors: Izak Nieuwoudt, Wichita, KS (US); Charles Griesel, Wichita, KS (US)

(73) Assignee: KOCH-GLITSCH, LP, Wichita, KS (US)

( * ) Notice: Subject to any disclaimer, the term of this patent is extended or adjusted under 35 U.S.C. 154(b) by 302 days.

(21) Appl. No.: 16/532,486

(22) Filed: Aug. 6, 2019

(65) Prior Publication Data

US 2020/0061490 A1 Feb. 27, 2020

Related U.S. Application Data

(60) Provisional application No. 62/714,960, filed on Aug. 6, 2018.

(51) Int. Cl.
*B01D 3/16* (2006.01)
*B01D 53/18* (2006.01)
*B01D 3/18* (2006.01)

(52) U.S. Cl.
CPC ............ *B01D 3/163* (2013.01); *B01D 53/18* (2013.01); *B01D 3/18* (2013.01)

(58) Field of Classification Search
CPC .......... B01D 3/163; B01D 53/18; B01D 3/18; B01D 3/225; B01D 3/205
See application file for complete search history.

(56) References Cited

U.S. PATENT DOCUMENTS

| 3,125,614 | A  | * | 3/1964 | Mayfield et al. | B01D 3/22 |
|---|---|---|---|---|---|
| | | | | | 261/114.1 |
| 4,956,127 | A | * | 9/1990 | Binkley | B01D 3/22 |
| | | | | | 261/114.1 |
| 5,147,584 | A | * | 9/1992 | Binkley | B01D 3/20 |
| | | | | | 261/114.3 |
| 6,193,222 | B1 | * | 2/2001 | Fan | B01D 3/163 |
| | | | | | 29/896.6 |
| 8,517,354 | B1 | * | 8/2013 | Binkley | B01D 3/163 |
| | | | | | 261/114.5 |
| 8,944,418 | B2 | * | 2/2015 | Headley | B01D 3/32 |
| | | | | | 261/114.5 |

(Continued)

FOREIGN PATENT DOCUMENTS

| CN | 2880208 Y | 3/2007 |
|---|---|---|
| CN | 203154856 U | 8/2013 |

(Continued)

OTHER PUBLICATIONS

International Preliminary Report on Patentability received for PCT Application No. PCT/IB2019/056664, dated Feb. 18, 2021, 9 Pages.

(Continued)

*Primary Examiner* — Stephen Hobson

(57) ABSTRACT

A multi-pass contact tray for use in a mass transfer column has a mixture of fixed valves to movable valves, with the numbers of the respective valves being selected to balance the volumetric flow of vapor through deck segments when the vapor is ascending at volumetric flow rates insufficient to maintain the movable valves in an open position.

16 Claims, 5 Drawing Sheets

(56) References Cited

U.S. PATENT DOCUMENTS

| | | | |
|---|---|---|---|
| 9,295,926 B2* | 3/2016 | Nieuwoudt | B01D 3/326 |
| 10,012,436 B2* | 7/2018 | Chen | B01D 3/225 |
| 10,160,702 B2* | 12/2018 | Alzner | B01D 3/324 |
| 10,258,936 B2* | 4/2019 | Nieuwoudt | F28C 3/06 |
| 2008/0277260 A1* | 11/2008 | Binkley | B01D 3/324 |
| | | | 202/160 |
| 2012/0118399 A1 | 5/2012 | Binkley et al. | |
| 2016/0339355 A1* | 11/2016 | Alzner | B01D 3/324 |
| 2017/0007943 A1* | 1/2017 | Nieuwoudt | B01D 3/163 |
| 2017/0136385 A1 | 5/2017 | Binkley | |
| 2018/0147504 A1* | 5/2018 | Binkley | B01D 3/26 |
| 2019/0192991 A1* | 6/2019 | Nieuwoudt | B01J 19/32 |

FOREIGN PATENT DOCUMENTS

| | | |
|---|---|---|
| CN | 103495287 A | 1/2014 |
| CN | 203408488 U | 1/2014 |
| GB | 803711 A | 10/1958 |
| WO | 2016/025403 A1 | 2/2016 |

OTHER PUBLICATIONS

International Search Report and Written Opinion received for PCT Application No. PCT/IB2019/056664, dated Jan. 3, 2020, 11 Pages.

* cited by examiner

MULTI-PASS CONTACT TRAY FOR A MASS TRANSFER COLUMN AND METHOD INVOLVING SAME

RELATED APPLICATIONS

This application claims priority to U.S. Provisional Application No. 62/714,960, filed on Aug. 6, 2018 which application is incorporated herein by reference in its entirety.

BACKGROUND OF THE INVENTION

The present invention relates generally to columns in which mass transfer and heat exchange occur and, more particularly, to multi-pass contact trays used in such columns to facilitate interaction between fluid streams flowing within the columns and methods of using such multi-pass contact trays.

Mass transfer columns are configured to contact at least two fluid streams in order to provide product streams of specific composition and/or temperature. The term "mass transfer column," as used herein is intended to encompass columns in which mass and/or heat transfer is the primary objective. Some mass transfer columns, such as those utilized in multicomponent distillation and absorption applications, contact a gas-phase stream with a liquid-phase stream, while others, such as extraction columns, may be designed to facilitate contact between two liquid phases of different densities. Oftentimes, mass transfer columns are configured to contact an ascending vapor or liquid stream with a descending liquid stream, usually along or above the surfaces of mass transfer structures that are placed in the interior region of the column to facilitate intimate contact between the two fluid phases. The rate and/or degree of mass and heat transferred between the two phases is enhanced by these mass transfer structures, which may be in the form of various types of contact trays, structured packing, random packing, or grid packing.

The contact trays used in mass transfer columns normally extend horizontally across substantially the entire horizontal cross section of the column and are supported around their perimeter by rings welded to the inner surface of the circular column wall or shell. A number of contact trays are positioned in vertically spaced-apart relationship. The contact trays may be located in only a portion of the column to perform one part of a multi-step process occurring with the column. Alternatively, the contact trays may fill substantially the entire open area within the column.

Contact trays of the type described above contain one or more downcomers that are positioned at openings in the tray deck to provide passageways for liquid to descend from one tray to an adjacent lower tray. In single-pass contact trays, each contact tray has a single downcomer positioned at one end of the tray deck and adjacent ones of the contact trays are oriented so that their downcomers are positioned at opposite ends of the tray decks. In this single-pass arrangement, liquid then flows from a receiving area at one end of the tray deck to the downcomer at the opposite end of the tray deck and then descend by way of the downcomer to the tray deck of the underlying contact tray where it flows in the opposite direction.

In multi-pass contact trays, more than one downcomer is provided on some or all of the tray decks and the liquid is split into multiple streams for flow in opposite directions on segments or flow passes of each tray deck. For example, in a two-pass arrangement, an upper contact tray in each pair of contact trays has a center downcomer and the underlying contact tray has a downcomer positioned at both ends of the tray deck. The liquid on the tray deck of the upper contact tray flows from the opposite receiving ends of the tray deck to the center downcomer and is then delivered to the center receiving area of the underlying tray deck where it splits into two streams flowing in opposite directions to the end downcomers.

As the liquid flows across the tray decks or deck segments prior to entering the downcomers, the liquid interacts with ascending vapor that passes through vapor openings provided in selected portions of the tray deck. Those areas of the tray deck containing vapor openings are commonly referred to as "active" areas because of the vapor and liquid mixing and frothing that occurs above those areas of the tray.

The vapor openings in the tray deck can be simple sieve holes or they can be formed as part of fixed or movable valves. Conventional valves have valve covers supported over the opening in the tray deck by legs or other support structures. In fixed valves, the valve cover is fixed against vertical movement. In movable valves, the valve cover is able to move up and down in response to variations in the pressure of vapor or fluid ascending through the opening. To allow vertical movement of the valve cover, the legs extend through the slots, the vapor openings or other openings in the tray deck and include a lower portion that is bent to contact an underside of the tray deck and thereby limit the range of vertical movement of the valve cover.

Typically, all of the valves on the trays are either fixed valves or movable valves, although it has been suggested to place some fixed valves on contact trays having movable valve, with the fixed valves being positioned at locations and oriented to facilitate the desired flow of liquid across the tray.

Contact trays with movable valves are normally more expensive to fabricate than fixed valve trays, but they offer advantages over fixed valve trays in some applications in that they allow the column to be operated more efficiently across a wider range of vapor flow rates. In particular, columns with movable-valve contact trays can be turned down to lower vapor flow rates before weeping of liquid through the valve orifices becomes a problem. This increased "turndown" results from some of the valves partially or completely closing as the vapor rate decreases below a certain value, which results in more of the vapor flow being redirected to the remaining valves that are more fully open, thereby maintaining sufficient vapor flow through all of the open valves to impeded weeping of liquid through the valves. As the vapor rate continues to decrease, more of the movable valves will partially or completely close and more of the vapor flow is likewise redirected to the more fully open valves to impede weeping.

One problem associated with the use of movable valves in multi-pass contact trays during turndown is the difficulty in maintaining the desired balance of vapor flow through the different tray deck segments or flow passes on opposite sides of the tray downcomers during turndown. Because the pressure drop through the deck segments is generally independent of the vapor flow rate as the valves are closing during turndown, imbalances in the vapor flow occur as more valves begin to close in one or more deck segments than others.

One approach to reducing these vapor flow imbalances involves using groups of valve covers of different weights. The heaviest group of valves will fully close during certain turndown flow rates and the remaining groups of lighter valves will remain fully open to maintain the desired vapor flow distribution to the various tray deck segments. During further reductions in vapor flow rates, the next group of valves that is lighter than the heavy valves that are already shut will fully close while any remaining group of still lighter valves remains fully open. In this way, the pressure drop remains sensitive to the vapor flow rate during a greater range of turndown flow rates, thereby facilitating hydraulic balancing of the tray deck segments or flow passes. Nonetheless, performance inefficiencies may occur as there remains some vapor flow ranges during turndown at which the pressure drop is independent of the vapor flow rate. As a result, a need remains for further improvements in multi-pass tray performance during turndown.

SUMMARY OF THE INVENTION

In one aspect, the present invention is directed to a multi-pass contact tray for use in a mass transfer column. The multi-pass contact tray comprises a tray deck having an upper surface for receiving a liquid stream, a downcomer inlet in the tray deck dividing the tray deck into deck segments positioned on opposite sides of the downcomer inlet, a downcomer extending downwardly from the downcomer inlet in the tray deck for guiding liquid downwardly after it flows across the deck segments and enters the downcomer through the downcomer inlet, and a plurality of fixed valves and a plurality of movable valves distributed across each of the deck segments. Each of the fixed valves and the movable valves comprises a valve cover positioned by a support structure over a valve opening in one of the deck segments that allows vapor to ascend through the deck segment and interact with the liquid when it flows across the deck segments and an open curtain area through which the vapor exits between the valve cover and the deck segment. The valve covers of the movable valves are movable between open and closed positions in response to changes in a volumetric flow of the vapor when it ascends through the deck segments. The lesser of a total area of the valve openings or a total area of the vertical curtain area of the plurality of fixed valves in relation to the lesser of a total area of the valve openings of the plurality of movable valves in each of the deck segments is selected to balance the volumetric flow of the vapor through the deck segments when the vapor is ascending through the valve openings at volumetric flow rates insufficient to maintain the movable valves in the open position.

In another aspect, the present invention is directed to a multi-pass contact tray comprising a tray deck having an upper surface for receiving a liquid stream, a chordal opening in the tray deck dividing the tray deck into deck segments positioned on opposite sides of the chordal opening, a downcomer extending downwardly from the chordal opening in the tray deck for guiding liquid downwardly after it flows across the deck segments and enters the downcomer through the chordal opening, and a plurality of fixed valves and a plurality of movable valves distributed across each of the deck segments. Each of the fixed valves and the movable valves comprises a valve cover positioned by a support structure over a valve opening in one of the deck segments that allows vapor to ascend through the deck segment and interact with the liquid when it flows across the deck segments. The valve covers of the movable valves being movable between open and closed positions in response to changes in a volumetric flow of the vapor when ascending through the deck segments. A total number of the plurality of fixed valves in relation to a total number of the plurality of movable valves is selected to balance the volumetric flow of the vapor through the deck segments when the vapor is ascending through the valve openings at volumetric flow rates insufficient to maintain the movable valves in the open position.

In a further aspect, the invention is directed to a method of balancing vapor flow through deck segments of a tray deck of a multi-pass contact tray during low vapor flow rates when the multi-pass tray is positioned within a mass transfer column. The method comprises the steps of: providing the tray deck with deck segments positioned on opposite sides of a chordal opening from which a downcomer extends downwardly; providing a plurality of fixed valves and a plurality of movable valves distributed across each of the deck segments, each of the fixed valves and the movable valves comprising a valve cover positioned by a support structure over a valve opening in one of the deck segments that allows vapor to ascend through the deck segment and interact with the liquid when it flows across the deck segments, the valve covers of the movable valves being movable between open and closed positions in response to changes in a volumetric flow of the vapor when ascending through the deck segments; and selecting a total number of the plurality of fixed valves in relation to a total number of the plurality of movable valves to balance the volumetric flow of the vapor between the deck segments when the vapor is ascending through the valve openings at volumetric flow rates insufficient to maintain the movable valves in the open position.

BRIEF DESCRIPTION OF THE DRAWINGS

In the accompanying drawings that form part of the specification and in which like reference numerals are used to indicate like components in the various views.

DETAILED DESCRIPTION

Figure 1:
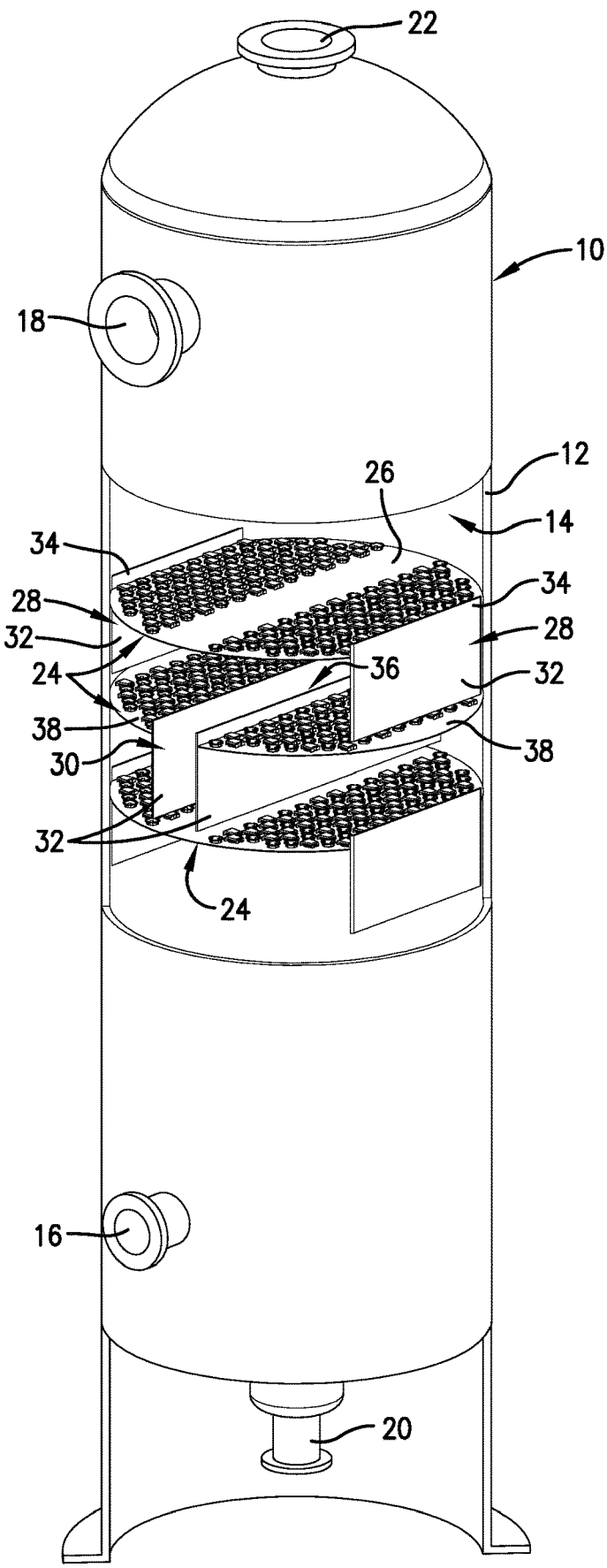
FIG. 1 is a fragmentary, perspective view of a mass transfer column in which a portion of a shell of the column is broken away to show one embodiment of multi-pass contact trays of the present invention.

Turning now to the drawings in greater detail and initially to FIG. 1, a mass transfer column suitable for use in mass transfer and/or heat exchange processes is represented generally by the numeral 10. The mass transfer column 10 includes an upright, external shell 12 that may be cylindrical in configuration, although other configurations, including polygonal, are possible and are within the scope of the present invention. The shell 12 may be of any suitable diameter and height and may be constructed from one or more rigid materials that are desirably inert to, or are otherwise compatible with, the fluids and conditions present during operation of the mass transfer column 10.

The mass transfer column 10 may be of a type used for processing fluid streams, typically liquid or vapor streams, to obtain fractionation products or to otherwise cause mass transfer or heat exchange between the fluid streams. For example, the mass transfer column 10 may be one in which crude atmospheric, lube vacuum, crude vacuum, fluid or thermal cracking fractionating, coker or visbreaker fractionating, coke scrubbing, reactor off-gas scrubbing, gas quenching, edible oil deodorization, pollution control scrubbing, or other processes occur.

The shell 12 of the mass transfer column 10 defines an open internal region 14 in which the desired mass transfer or heat exchange between the fluid streams occurs. In one implementation, the fluid streams may comprise one or more ascending vapor streams and one or more descending liquid streams. In other implementations, the fluid streams may comprise substantially any combination of ascending or descending liquid streams or ascending or descending vapor streams.

One or more fluid streams may be directed into the mass transfer column 10 through any number of feed lines, such as lower feed line 16 and upper feed line 18, positioned at appropriate locations along the height of the mass transfer column 10. In one implementation, vapor streams may be generated within the mass transfer column 10 rather than being introduced into the mass transfer column 10 through the feed lines 16 and 18. One or more fluid streams may be directed out of the mass transfer column 10 through any number of takeoff lines, such as lower takeoff line 20 and upper takeoff line 22. In one implementation, liquid may be introduced through upper feed line 18, descend through the mass transfer column 10, and be removed through lower takeoff line 20, while vapor may be introduced through lower feed line 16, ascend through the mass transfer column 10, and be removed through upper takeoff line 22.

Other mass transfer column components that would typically be present, such as reflux stream lines, reboilers, condensers, vapor horns, liquid distributors, and the like, are not illustrated in the drawing figures because they are conventional in nature and an illustration of these components is not believed to be necessary for an understanding of the present invention.

A plurality of multi-pass contact trays 24 are positioned within the open internal region 14 of the mass transfer column 10 to facilitate interaction of the fluids flowing within the open internal region 14. The multi-pass contact trays 24 extend generally horizontally across the entire cross-section of the mass transfer column 10 and are arranged in vertically spaced-apart relationship to each other. The specific design of each multi-pass contact tray 24 can be varied while remaining within the scope of the present invention.

In the illustrated embodiment of FIGS. 1-6, the multi-pass contact trays 24 are constructed to form a two-pass fluid flow arrangement in which a liquid stream is split into two streams that flow in opposite directions on an upper surface of a tray deck 26 of each multi-pass contact tray 24. Although the invention will be described herein with respect to multi-pass contact trays 24 arranged in this two-pass fluid flow arrangement, the invention encompasses multi-pass contact trays 24 that are constructed in three-pass, four-pass, five-pass, six-pass and other multi-pass flow arrangements.

To achieve the two-pass fluid flow, one of the paired multi-pass contact trays 24 has two downwardly-extending side downcomers 28 that are positioned at opposite ends of the tray deck 26, which may be formed from interconnected individual tray panels. The side downcomers 28 receive split liquid streams that flow in opposite directions from a central receiving area on the tray deck 26 of the associated multi-pass contact tray 24 and deliver the split liquid streams downwardly to receiving areas on opposite ends of the tray deck 26 of an underlying one of the paired multi-pass contact trays 24. The split liquid streams received on that tray deck 26 then flow in opposite directions across the tray deck 26 towards a downwardly-extending center downcomer 30 where they are recombined and delivered to the central receiving area on the tray deck 26 of the next underlying multi-pass contact tray 24. This flow pattern is repeated on each successive one of the of the multi-pass contact trays 24.

The side downcomers 28 are shown as having a chordal downcomer wall 32 and the center downcomers 30 are shown as having a pair of such chordal downcomer walls 32. The chordal downcomer walls 32 extend in a chordal fashion across the open internal region 14 of the mass transfer column 10 from opposite sides of the shell 12. An upward extension of each downcomer wall 32, or a separate panel attached to the downcomer wall 32, forms an outlet weir 34 that causes liquid to accumulate to a preselected height on the tray deck 26 before it spills over the outlet weir 34 and enters the side downcomers 28 and center downcomers 30. Inlet weirs (not shown) may be provided adjacent the liquid receiving area on the tray decks 26 to cause liquid discharged from the side downcomers 28 and center downcomers 30 to accumulate to a preselected height on the liquid receiving area above the level of the downcomer outlet before it spills over the inlet weirs, thereby sealing against vapor entry into the downcomer. A lower portion of each downcomer wall 32 is spaced above the underlying tray deck 26 or contains flow openings (not shown) to allow fluid to exit the side downcomers 28 and center downcomers 30 and flow along the upper surface of the tray deck 26 before entering another one of the side or center downcomers 28 and 30. The downcomer walls 32 are illustrated as being planar and vertically-extending, but other types of downcomer walls such as stepped, sloped and/or multi-chordal walls, or other constructions are within the scope of the invention.

The center downcomer 30 is positioned at a center, chordal opening 36 in the tray deck 24 that divides the tray deck 24 into two deck segments 38 or flow passes of generally equal surface area. In other multi-pass arrangements when off-center downcomers are used, the deck segments or flow passes that feed into the off-center downcomers may be of different surface area. The center downcomer 30 operates to guide liquid downwardly to the tray deck 26 of an underlying one of the multi-pass contact trays 24 after it flows across the deck segments 38 and enters the center downcomer 30 through the chordal opening 36.

Figure 2:
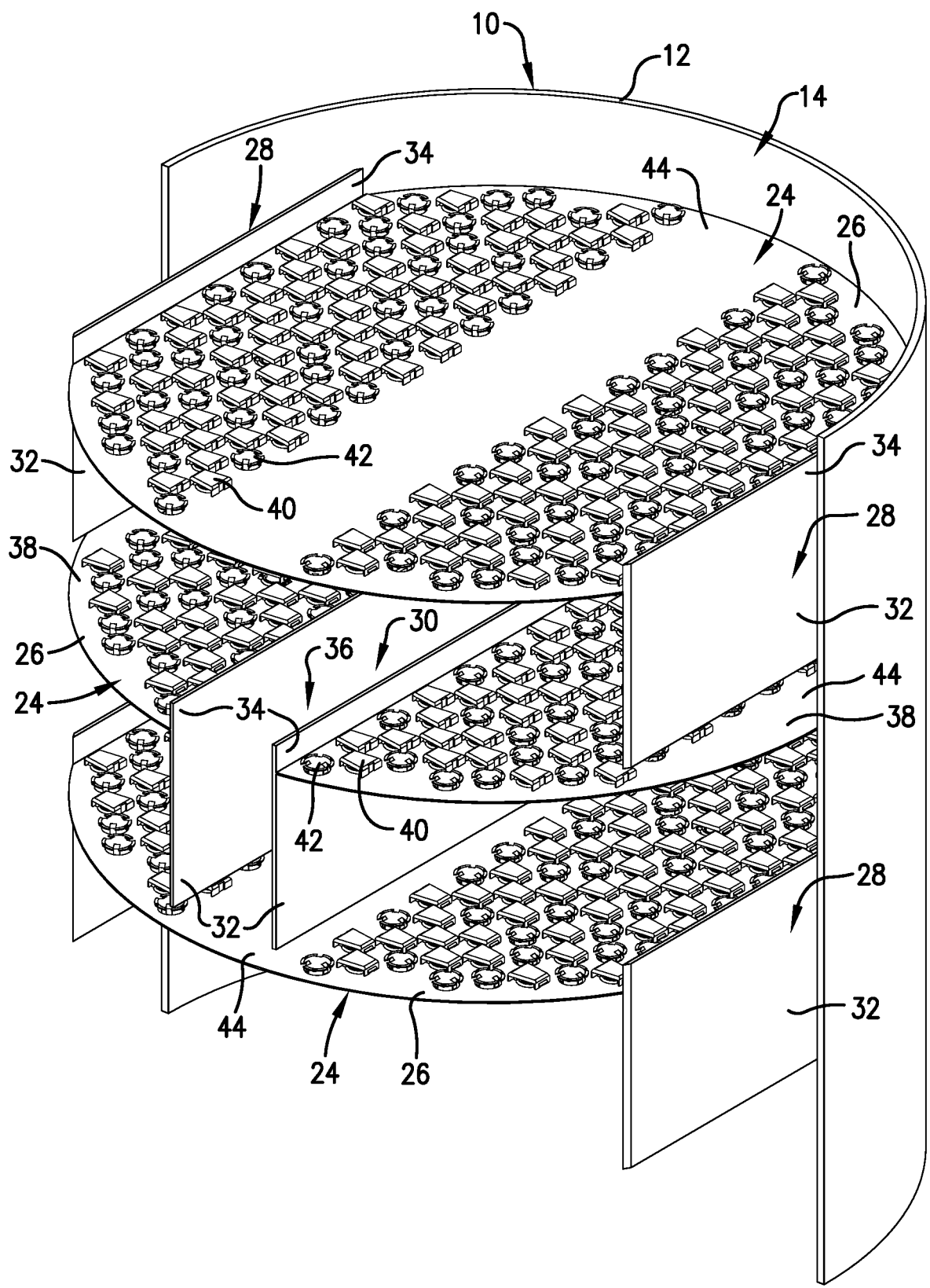
FIG. 2 is a fragmentary, perspective view of the multi-pass contact trays in the column shown in FIG. 1, and shown on an enlarged scale from that used in FIG. 1.

Turning more specifically to FIG. 2, a plurality of fixed valves 40 and a plurality of movable valves 42 are distributed across the tray decks 26 of each of the multi-pass contact trays 24 to allow vapor or another fluid to ascend through the tray decks 26 and interact with the liquid flowing across the upper surface of the tray decks 26. The area of the tray decks 26 containing these fixed valves 40 or movable valves 42 is normally referred to as the active area of the multi-pass contact trays 24. The fixed valves 40 and movable valves 42 are arranged in a preselected arrangement on the active area. The fixed valves 40 are intermixed with the movable valves 42 in manner that is at least somewhat dependent on the relative numbers of fixed valves 50 to movable valves 52. In the embodiment illustrated in FIGS. 1-5, the fixed valve 40 and movable valves 42 are arranged in parallel rows and the fixed valves 40 and movable valves 42 are intermixed in each row. The parallel rows are arranged such the fixed and movable valves 40 and 42 in adjacent rows are staggered to form a triangular pitch. In an example of another arrangement, the fixed and movable valves 40 and 42 in adjacent rows are aligned to form a square pitch. In the embodiment illustrated in FIG. 6, each row contains only fixed valves 40 or movable valves 42, with the number of rows of fixed valves 40 being greater than the number of rows of movable valves 42 such that there are more fixed valves 40 than movable valves 42.

The area of the tray deck 26 on each multi-pass contact tray 24 that underlies the side downcomer 28 or center downcomer 30 comprises an inlet panel 44. The inlet panel 44 is normally imperforate or has shielded flow passages that impede or prevent the descending fluid discharged from side downcomer 28 or center downcomer 30 from passing through the inlet panel 44.

Figure 3:
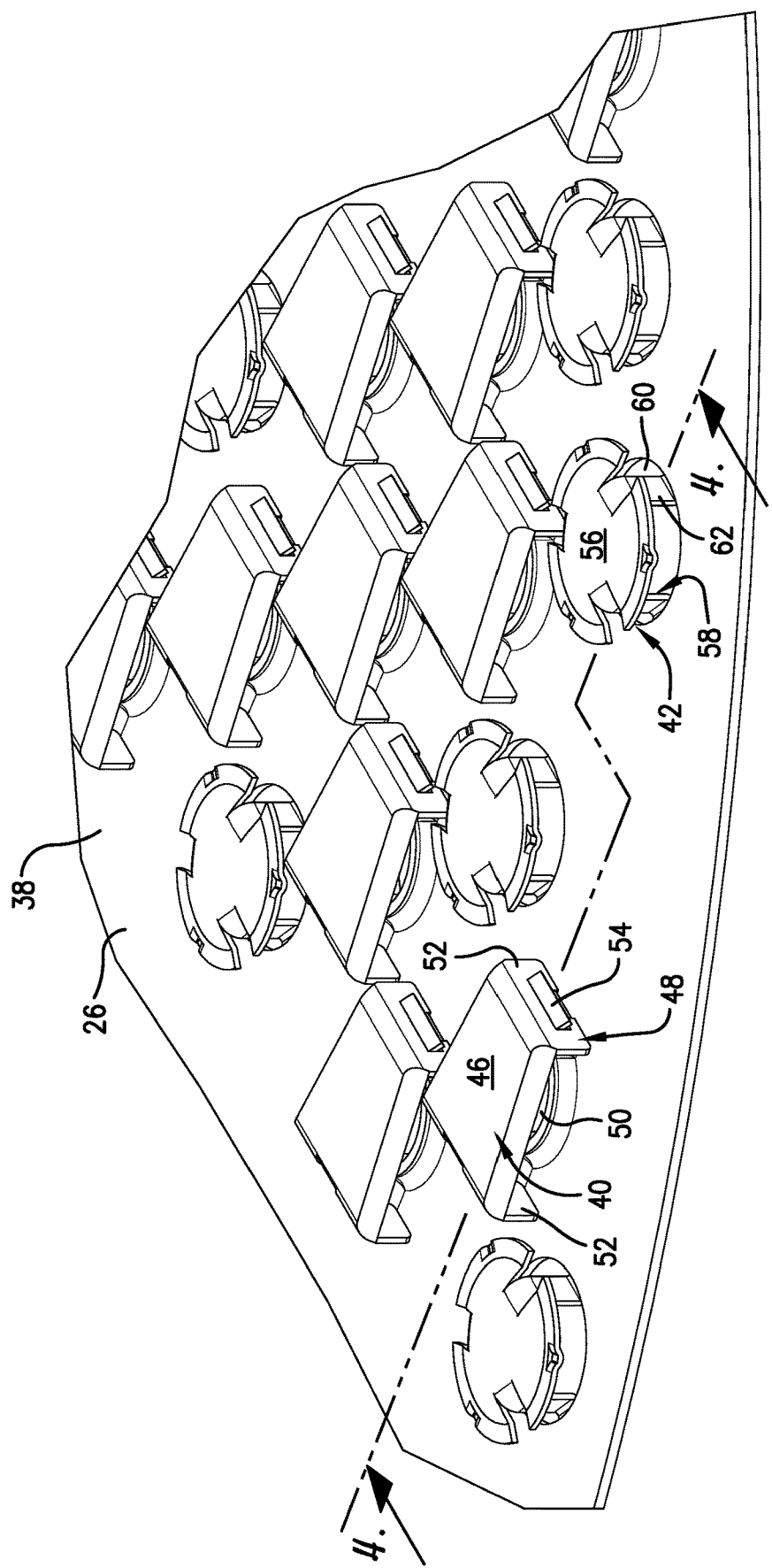
FIG. 3 is a fragmentary, perspective view of one of the multi-pass contact trays of FIGS. 1 and 2, showing fixed and movable valves of the multi-pass contact tray on a further enlarged scale and with the movable valves shown in an open position.
Figure 4:
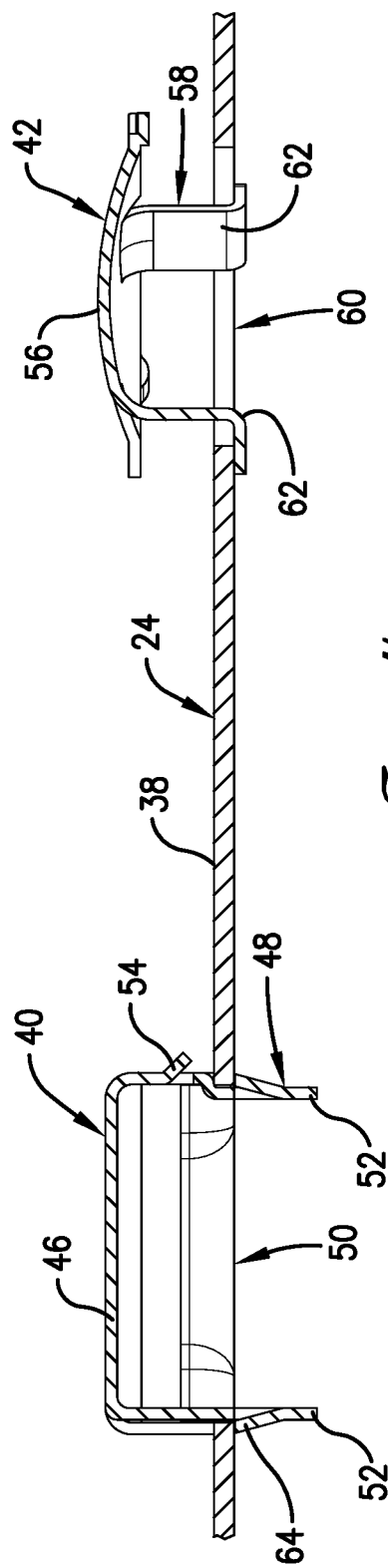
FIG. 4 is a fragmentary side elevation view of one of the multi-pass contact trays taken in vertical section along line segments 4-4 of FIG. 3 in the direction of the arrows and shown on a further enlarged scale with the movable valve shown in the open position.
Figure 5:
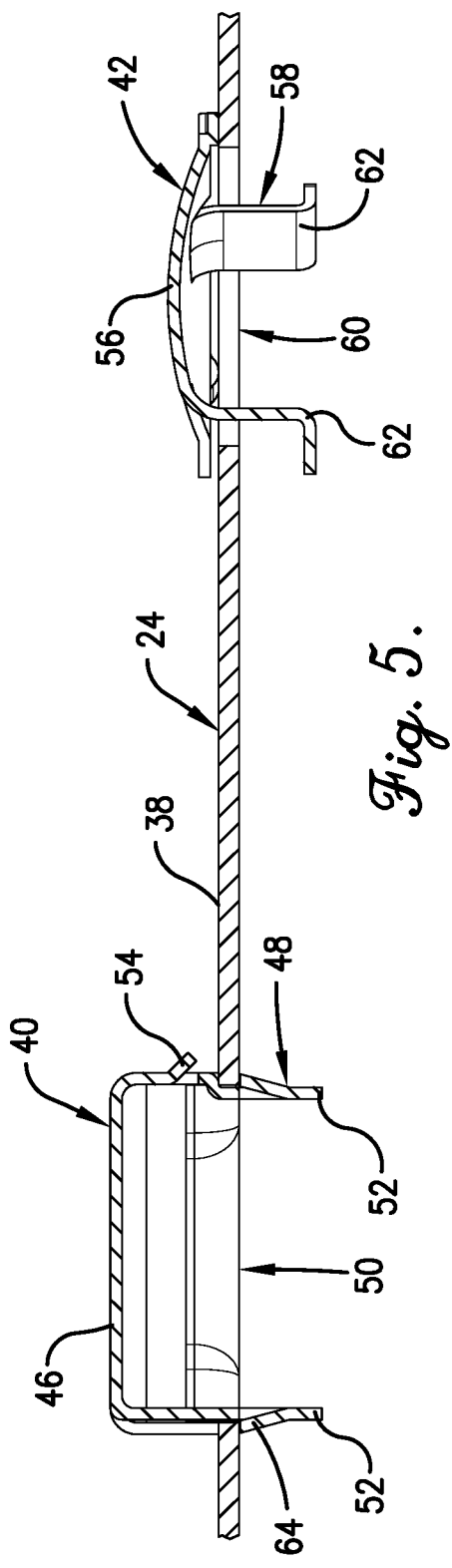
FIG. 5 is an elevation view of the multi-pass contact tray shown in FIG. 4 with the movable valve shown in a closed position.
Figure 6:
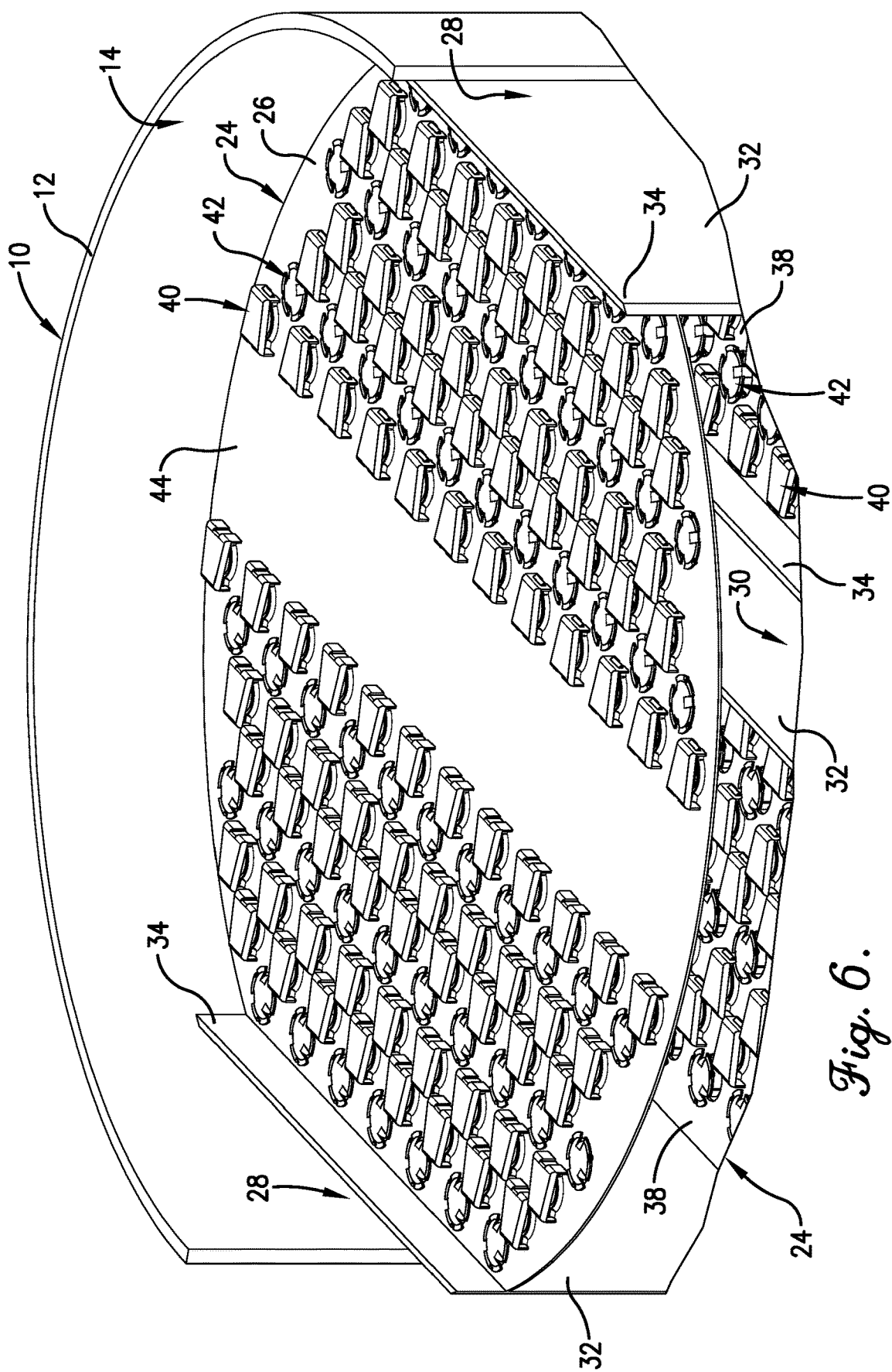
FIG. 6 is a is a fragmentary, perspective view of another embodiment of the multi-pass contact trays in the column and showing a different arrangement of the fixed and movable valves than that shown in FIG. 2.

Turning now more specifically to FIGS. 3-5, each of the fixed valves 30 comprises a valve cover 46 positioned by a support structure 48 over a valve opening 50 in the deck segment 38. The valve opening 50 allows vapor to ascend through the deck segment 38 and interact with the liquid when it flows across the deck segments 38 before entering the side downcomer 28 or the center downcomer 30 shown in FIGS. 1 and 2. The valve cover 46 is positioned in covering relationship to the valve opening 50 to shield the valve opening 50 against the detrimental downward weeping of fluid through the valve opening 50. The support structure 48 in one embodiment comprises legs 52 that space the valve cover 46 a preselected distance above the upper surface of the tray deck 26 and fix the valve cover 46 against movement. The number of legs 52 used for each fixed valve 30 can be varied. In one embodiment, two legs are used, while in other embodiments more than two legs are used. A vent 54 may be provided in a downstream one of the legs 52 to allow vapor to ascending vapor to pass through the leg 52 in the direction of bulk flow across the tray deck 24. In one variation, the fixed valves 30 are formed by punching a portion of the deck segment 38 upwardly and the support structure comprises two sloping portions that connect the valve cover 46 to the deck segment 38. In another variation, the fixed valves 30 are formed as directional louvers that are punched upwardly from the tray deck 26 and the support structure 48 comprises a sloping portion that connects the valve cover 46 to the deck segment 38. In some embodiments, each of the fixed valves 40 forms oppositely directed flow openings for the vapor after it ascends through the associated valve opening 50 in the deck segment 38.

Each of the movable valves 42 likewise comprises a valve cover 56 positioned by a support structure 58 over a valve opening 60 in the deck segment 38 that allows vapor to ascend through the deck segment 38 for interaction with liquid on the deck segment 38. The valve cover 56 is positioned in covering relationship to the valve opening 60 to shield the valve opening 60 against liquid weeping. The support structure 58 will typically include two or more legs 62 that are attached at their upper ends to the valve cover 56. The legs 62 extend downwardly through the deck segments 38 in a manner that allows the valve cover 56 to float up and down between an open position as shown in FIG. 4 and a closed position as shown in FIG. 5 in response to variations in vapor pressure acting against an underside of the valve cover 56. For example, the legs 62 may each have a lower portion that extends below the deck segment 38 and includes at least one stop 64 for contact against an underside of the deck segment 38 to limit the vertical movement of the leg 62. The legs 62 may extend through slots in the deck segment 38, through the valve opening 60, or through extensions of the valve opening 56. The fixed and movable valves 40 and 42 may have constructions that differ from what is shown in the drawings and remain within the scope of the invention.

The vapor flow through each of the fixed and movable valves 40 and 42 is limited by the lesser of either the open area of their respective valve openings 50 and 60 or the open curtain area through which the vapor exits between the valve cover 46 and 56 and the deck segment 38. In accordance with the present invention, the desired balance of vapor flow through each deck segment 38 or flow pass is maintained during turndown of the vapor flow when the volumetric flow of the vapor is insufficient to maintain the movable valves 42 in the open position. This balance of vapor flow is achieved during turndown by appropriate selection of a total open vapor flow area of the fixed valves 40 in relation to the movable valves 42 in each deck segment 38 or flow pass.

In one embodiment, the lesser of a total area of the valve openings 50 or a total area of the vertical curtain area of the plurality of fixed valves 40 in relation to the lesser of a total area of the valve openings 60 of the plurality of movable valves 42 in each of the deck segments 38 is selected to balance the volumetric flow of the vapor through the deck segments when the vapor is ascending through the valve openings 60 at volumetric flow rates insufficient to maintain the movable valves 42 in the open position. As one example, the total area of the valve openings 50 of the plurality of fixed valves 40 may be between 60% and 95% of the sum of the total areas of the valve openings 50 and 60 of the plurality of fixed valves 40 and the plurality of moveable valves 42 in each of the deck segments 38. As another example, the total area of the valve openings 50 of the plurality of fixed valves 40 may be between 70% and 90% of the sum of the total areas of the valve openings 50 and 60 of the plurality of fixed valves 40 and the plurality of moveable valves 42 in each of the deck segments 38.

In another embodiment, a total number of the plurality of fixed valves 40 in relation to a total number of the plurality of movable valves 42 is selected to balance the volumetric flow of the vapor through the deck segments 38 when the vapor is ascending through the valve openings 60 at volumetric flow rates insufficient to maintain the movable valves 42 in the open position. As one example, wherein a total number of the plurality of fixed valves 40 is between 60% and 95% of the sum of the total number of the plurality of fixed valves 40 and a total number of the plurality of the movable valves 42 in each of the deck segments 38. As another example, the total number of the plurality of fixed valves 40 is between 70% and 90% of the sum of the total numbers of fixed valves 40 and moveable valves 42 in each deck segment 38.

By adding the movable valves 42 to the deck segments 38 of the multi-pass contact trays 24 in fewer numbers than the fixed valves 40, the performance advantage of reduced weeping during turndown can be realized with only a marginal increase in the cost of the multi-pass contact tray 24 resulting from using the normally more expensive moveable valves 42. In testing conducted using an air/water system with a deck segment having 72% FLEXIPRO™ fixed valves and 38% Type A moveable valves (both valves types being available from Koch-Glitsch, LP and corresponding to the fixed valves 40 and movable valves 42 illustrated in the drawings) in comparison to a deck segment having only FLEXIPRO™ fixed valves, the deck segment having the mixture of valves could be operated to significantly lower vapor rates than the deck segment with only the fixed valves before 10% weeping was observed. This performance improvement was obtained without any meaningful impact on the capacity or pressure drop of the deck segment 38 and, importantly, without any observed vapor flow region where the pressure drop was independent of the vapor flow rate. This testing thus demonstrates that the vapor flow through the deck segments 38 in the multi-pass contact tray 24 can be balanced during turndown when the vapor is ascending through the valve openings 60 at volumetric flow rates insufficient to maintain the movable valves 42 in their open position.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A multi-pass contact tray for use in a mass transfer column, said multi-pass contact tray comprising:
    a tray deck having an upper surface for receiving a liquid stream;
    a downcomer inlet in the tray deck dividing the tray deck into deck segments positioned on opposite sides of the downcomer inlet;
    a downcomer extending downwardly from the downcomer inlet in the tray deck for guiding liquid downwardly after the liquid flows across the deck segments and enters the downcomer through the downcomer inlet; and
    a plurality of fixed valves and a plurality of movable valves distributed across each of the deck segments, each of the fixed valves and the movable valves comprising a valve cover positioned by a support structure over a valve opening in one of the deck segments that allows vapor to ascend through the deck segment and interact with the liquid when the liquid flows across the deck segments and an open curtain area through which the vapor exits between the valve cover and the deck segment, the valve covers of the movable valves being movable between open and closed positions in response to changes in a volumetric flow of said vapor when ascending through the deck segments,
    wherein the lesser of (i) a total area of the valve openings and (ii) a total area of the vertical curtain area of the plurality of fixed valves in relation to (b) the lesser of (i) a total area of the valve openings and (ii) a total area of the vertical curtain area of the plurality of movable valves in each of the deck segments is such that the volumetric flow of said vapor through the deck segments is balanced when said vapor is ascending through the valve openings at volumetric flow rates insufficient to maintain the movable valves in the open position.

2. The multi-pass contact tray of claim 1, wherein the total area of the valve openings of the plurality of fixed valves is between 60% and 95% of the sum of the total areas of the valve openings of the plurality of fixed valves and the plurality of moveable valves in each of the deck segments.

3. The multi-pass contact tray of claim 1, wherein the total area of the valve openings of the plurality of fixed valves is between 70% and 90% of the sum of the total areas of the valve openings of the plurality of fixed valves and the plurality of moveable valves in each of the deck segments.

4. The multi-pass contact tray of claim 1, wherein the deck segments are of generally equal surface area and the ratio of the total area of the valve openings of the plurality of fixed valves and the total area of the valve openings of the movable valves in each of the deck segments is the same.

5. The multi-pass contact tray of claim 1, wherein the deck segments are of generally unequal surface area and the ratio of the total area of the valve openings of the plurality of fixed valves and the total area of the valve openings of the movable valves in each of the deck segments is not the same.

6. The multi-pass contact tray of claim 1, wherein in some or all of the fixed valves there are oppositely directed flow openings for the vapor after the vapor ascends through the valve opening and is redirected by the valve cap.

7. The multi-pass contact tray of claim 1, wherein the valve caps of the movable valves are supported by legs that extend through slots in the deck segments.

8. The multi-pass contact tray of claim 1, wherein the fixed valves and the movable valves are intermixed in rows.

9. A multi-pass contact tray for use in a mass transfer column, said multi-pass contact tray comprising:
    a tray deck having an upper surface for receiving a liquid stream; a chordal opening in the tray deck dividing the tray deck into deck segments positioned on opposite sides of the chordal opening;
    a downcomer extending downwardly from the chordal opening in the tray deck for guiding liquid downwardly after the liquid flows across the deck segments and enters the downcomer through the chordal opening; and
    a plurality of fixed valves and a plurality of movable valves distributed across each of the deck segments, each of the fixed valves and the movable valves comprising a valve cover positioned by a support structure over a valve opening in one of the deck segments that allows vapor to ascend through the deck segment and interact with the liquid when the liquid flows across the deck segments, the valve covers of the movable valves being movable between open and closed positions in response to changes in a volumetric flow of said vapor when ascending through the deck segments,
    wherein in each of the deck segments a total number of the plurality of fixed valves in relation to a total number of the plurality of movable valves is such that the volumetric flow of said vapor through the deck segments is balanced when said vapor is ascending through the valve openings at volumetric flow rates insufficient to maintain the movable valves in the open position.

10. The multi-pass contact tray of claim 9, wherein a total number of the plurality of fixed valves is between 60% and 95% of the sum of the total number of the plurality of fixed valves and a total number of the plurality of the moveable valves in each of the deck segments.

11. The multi-pass contact tray of claim 9, wherein a total number of the plurality of fixed valves is between 70% and 90% of the sum of the total number of the plurality of fixed valves and a total number of the plurality of the moveable valves in each of the deck segments.

12. The multi-pass contact tray of claim 9, wherein the deck segments are of generally equal surface area and the ratio of the total area of the valve openings of the plurality of fixed valves and the total area of the valve openings of the movable valves in each of the deck segments is the same.

13. The multi-pass contact tray of claim 9, wherein the deck segments are of generally unequal surface area and the ratio of the total area of the valve openings of the plurality of fixed valves and the total area of the valve openings of the movable valves in each of the deck segments is not the same.

14. The multi-pass contact tray of claim 9, wherein in some or all of the fixed valves there are oppositely directed flow openings for the vapor after the vapor ascends through the valve opening and is redirected by the valve cap.

15. The multi-pass contact tray of claim 9, wherein the valve caps of the movable valves are supported by legs that extend through slots in the deck segments.

16. The multi-pass contact tray of claim 9, wherein the fixed valves and the movable valves are intermixed in rows.

* * * * *